INVENTORS.
BRUCE G. EATON
WILLIAM J. CLARK
BY
Richard W. Treverton
ATTORNEY.

May 22, 1951     B. G. EATON ET AL     2,553,642
AERODYNAMIC BRAKE AND AUTOMATIC CONTROL
SYSTEM FOR AIRCRAFT

Filed Aug. 26, 1948     2 Sheets—Sheet 2

INVENTORS.
BRUCE G. EATON
WILLIAM J. CLARK
BY
Richard W. Treverton
ATTORNEY.

UNITED STATES PATENT OFFICE 2,553,642

AERODYNAMIC BRAKE AND AUTOMATIC CONTROL SYSTEM FOR AIRCRAFT

Bruce G. Eaton, Columbus, and William J. Clark, Bexley, Ohio, assignors to Curtiss-Wright Corporation, a corporation of Delaware Application August 26, 1948, Serial No. 46,278

15 Claims. (Cl. 244—113)

The present invention relates to a dive brake system for aircraft and particularly for radio controlled and other types of pilotless airplanes.

When a conventional piloted airplane is rapidly maneuvered the pilot's senses and the pressure of the controls make him more or less constantly aware of the acceleration load or G-load on the airplane, to the end that very violent maneuvers which would destroy the airplane are avoided. In the case of aircraft controlled from a remote point or by automatic means this human protective system is not available with the result that a maneuver may be made which will subject the structure to an excessive G-load, especially if the airplane's velocity is greater than the operator realizes, or, in the case of automatic control, if the velocity is greater than that anticipated in the design of the control mechanism. A condition of excessive G-load can of course develop very quickly in an airplane of clean aerodynamic design if for any reason it is caused to assume a diving attitude. Linear acceleration may be so rapid that by the time the automatic control means or the human operator at a remote station becomes aware of the diving attitude and takes corrective action the airplane's velocity may be so high the normal recovery movements of the controls will result in excessive loads upon the airplane structure.

According to the present invention dive brakes actuated by inflatable bladders are mounted on the vertical stabilizer surfaces of the airplane, and, by a novel arrangement of Venturi tube and air valve, the ram or dynamic pressure of the adjacent airstream is utilized both to extend and to retract the brakes. The air valve is operated by an electrical solenoid or other type of motor in response to attitude sensing means, preferably in the form of a gyroscope, so that whenever the airplane assumes a diving attitude the brakes are automatically extended.

The invention further contemplates means for extending the brakes in proportion to the diving angle of the airplane, so that for a shallow dive, in which there will be a relatively small linear acceleration force on the airplane, there will be a correspondingly small braking effort; and as the linear acceleration forces become greater, with greater diving angles, correspondingly greater braking effort will be applied. This objective is conveniently accomplished by arranging a pair of potentiometers, one operated by the gyroscope and the other by the braking means, in a Wheatstone bridge circuit whose output current reflects the balance or unbalance of the bridge and is utilized to control the actuating motor for the air valve of the brake system. The arrangement is such that the bridge is balanced and has zero current output when the brake means have assumed the proper position for the particular diving angle reflected by the gyroscope. Otherwise the bridge is unbalanced and its current output initiates whatever action of the control system is necessary to restore bridge balance.

The invention further contemplates a combination in which the same gyroscope that controls the dive brake system is utilized to control the aircraft elevator. It still further contemplates an elevator control system utilizing a wheatstone bridge circuit similar to that employed in the brake system and having the advantages set forth hereinbefore in connection with the brake system.

The foregoing and other objects and advantages will appear from the following description of the invention, made with reference to the accompanying drawings, wherein.

Figure 1:
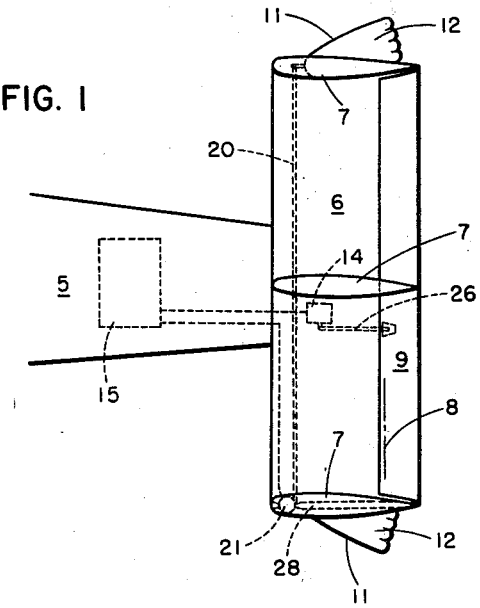
Figure 1 is a plan view of the aft portion of an airplane including a horizontal stabilizer with a hinged elevator control surface and a vertical stabilizer provided with hinged brake surfaces.
Figure 2:
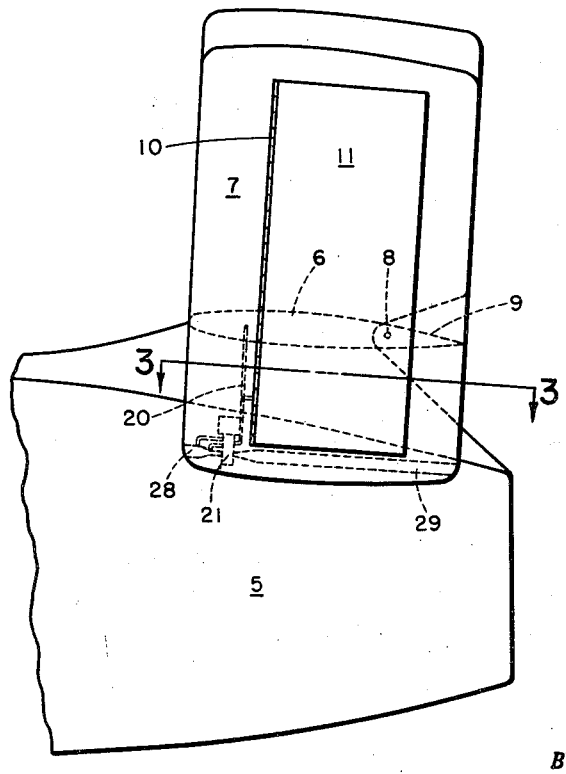
Figure 2 is a side elevation, on a larger scale, of the aircraft structure shown in Figure 1.
Figure 3:
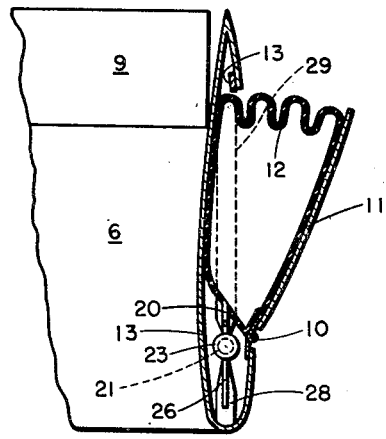
Figure 3 is a sectional view, on a still larger scale, taken along line 3—3 of Figure 2.

As illustrated in the drawings the airplane includes a fuselage 5, horizontal stabilizer 6 and vertical stabilizers 7. Hinged along an axis indicated at 8 to the trailing edge of stabilizer 6 is an elevator 9 and hinged at 10 to the outboard vertical stabilizers 7 are dive brakes 11. Each of the latter constitues a panel forming a part of the outer surface of one of stabilizers 7, and operable by a flexible bladder 12 between an open position, shown in Figures 1 and 3, and a closed position. Each bladder preferably is formed of rubber or like material and has its opposite side walls bonded to the brake 11 and to the stabilizer 7 so that as it is inflated the brake will be swung about its hinge 10 toward open position, and when deflated it is contained entirely within the confines of the stabilizer and the brake is fully retracted and seats upon the stop 13 shown in Figure 3.

Figure 4:
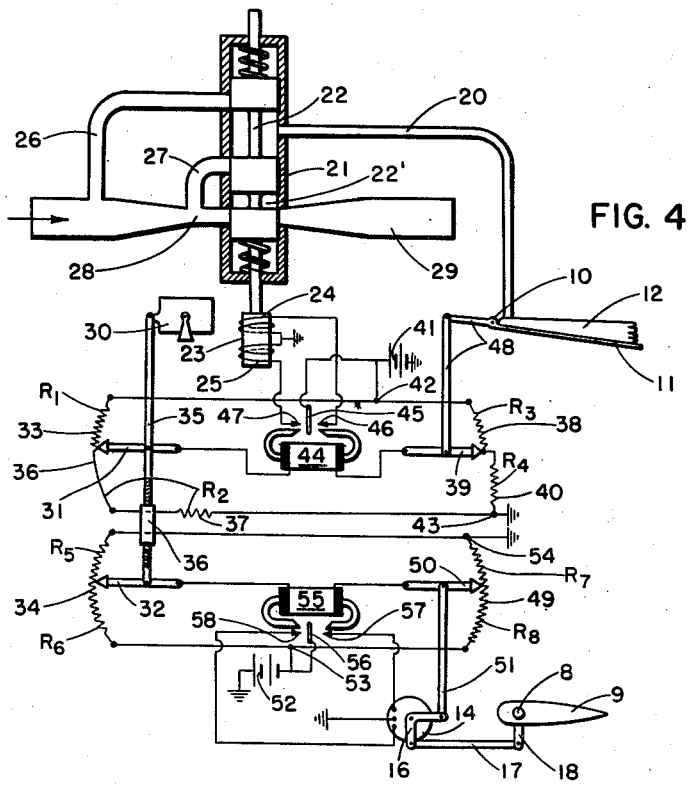
Figure 4 is a schematic view showing the control means for the brake structure illustrated in Figures 1 to 3; and, Figure 5 is a sectional view of a modified Venturi tube and air valve arrangement for use in a system like that shown in Figure 4.

The bladders are connected by a tube 20 leading to a valve casing 21 containing a spring centered slide valve 22 operated by a motor which may comprise a solenoid 23 having opposed windings 24 and 25. Into the valve casing open a pressure passage 26 and a suction passage 27 which join respectively into an enlarged portion and a restricted or throat portion 28 of a Venturi tube. This tube extends longitudinally through one stabilizer 13, having its mouth opening forwardly into the air stream at the leading edge of the stabilizer and having its discharge end 29 adjacent the trailing edge of the stabilizer. In the neutral position of the valve shown in Figure 4 and which occurs when neither solenoid winding is energized, the valve 22 closes tube 20 from both the pressure and suction conduits, 26 and 27. When solenoid winding 24 is energized the valve is moved to uncover the pressure passage 26, so that ram air entering the mouth of the Venturi tube may pass through tube 20 to inflate the bladder 12. It will be seen that in this condition the valve 22 also serves to block the passage of air from the throat of the venturi into the discharge section 29 so that any air entering the mouth of the tube must necessarily flow into passage 26. When the opposed solenoid winding 25 is energized the Venturi tube is opened for through passage of ram air, such passage being through recess 22' of the valve, and passage 27 is also uncovered by the valve while passage 26 is covered thereby. Accordingly suction will prevail at the Venturi throat 28 withdrawing air from tube 20 and deflating the bladder 12.

The solenoid 23 and a motor 14 for operating elevator 9 may be controlled by means contained in a housing 15 within the fuselage. These control means may include a gyroscope 30 arranged to operate sliding contacts 31 and 32 of potentiometers 33 and 34, respectively. In the schematic illustration the gyroscope is connected with contact 31 by pivoted link 35 of fixed length, while the connection to contact 32 is adjustable in length by means shown schematically as comprising a screw threaded member 36 and constituting means for adjusting the reference plane of the gyroscope. This adjusting means may be operated by any suitable means (not shown) such as radio controlled means in the case of a remote control system.

With the arrangement illustrated the gyroscope will swing to move link 35 relatively downwardly from the neutral position shown if the aircraft is placed in a climbing attitude and upwardly if the aircraft is placed in a diving attitude, so that the resistance of the portion of potentiometers 33 and 34 shown as above the sliding contacts, and designated $R_1$ and $R_5$, respectively, will be decreased as the diving angle increases, and the resistance $R_6$ of the portion of the potentiometer 34 below contact 32 will increase with increase of the diving angle. The portion 36 of the potentiometer 33 below the contact 31 (when the latter is in neutral position) comprises a conductor of negligibly small resistance so that when there is a change in the positive angle of attack of the airplane, as when the airplane changes from level flight to a climbing attitude, or vice versa, there will be no appreciable change in the resistance value $R_1$ nor of the resistance value $R_2$ of the portion of the potentiometer 33, 36 below the contact 31. The value $R_2$ will of course increase with increase of the angle of dive from level flight position since in this case the value $R_2$ will include some portion of the resistor 33 shown as above contact 31 in Figure 4. There is arranged in series with potentiometer part 36 a fixed resistance element 37 whose resistance is a part of the value $R_2$.

Arranged to form a Wheatstone bridge with potentiometer 33, 36 and resistance 37 are a potentiometer 38 having sliding contact 39 and a fixed resistance element 40. The portion of the potentiometer 38 shown as above the contact 39 is considered to have a resistance value $R_3$ and the portion below the contact including resistor 40 to have a resistance value $R_4$. A direct current source 41 is connected across the input terminals of the bridge, one such input terminal being the juncture 42 of resistances $R_1$ and $R_3$ and the other such terminal being the juncture 43 of $R_2$ and $R_4$. Connected across the output terminals of the bridge is a three-position polarized relay 44 having a movable contact 45 and right and left fixed contacts 46 and 47 connected respectively to windings 24 and 25 of solenoid 23. One such output terminal is contact 31 at the juncture of resistances $R_1$ and $R_2$ and the other is contact 39 at the juncture of resistances $R_3$ and $R_4$. A suitable linkage connected to the dive brake 11 and indicated schematically at 48 serves to operate sliding contact 39 to decrease the resistance value $R_3$ and increase value $R_4$ as the brake is extended by inflation of bladder 12.

A second Wheatstone bridge circuit is formed by potentiometer 34 and another potentiometer designated 49, the latter having a sliding contact 50 operated through linkage 51 by the reversible electric motor 14. A direct current source 52 is connected across the input terminals 53 and 54 of the bridge circuit while a polarized relay 55 is connected across the contacts 32 and 50 which constitute the bridge output terminals. Resistance value $R_5$ is assigned to the arm of the bridge between terminals 32 and 54, $R_6$ to the arm between 32 and 53, $R_7$ to the arm between 50 and 54, and $R_8$ to the arm between 50 and 53. The movable contact 56 of relay 55 is in open position when the relay is de-energized, and when the latter is energized closes against either right fixed contact 57 or left fixed contact 58, depending upon the direction of current flow through the coil of the relay. When contact 57 is closed the motor is energized by current source 52 to operate in a counterclockwise direction as viewed in Figure 4 to raise the elevator 15 and shift contact 50 upwardly to reduce the ratio of $R_7$ to $R_8$; and when contact 58 is closed the motor is operated in the opposite direction with opposite effect.

In operation of the system with the airplane in intentional level flight, the contacts 31 and 32 will be held in the neutral position shown by gyroscope 30. Contacts 39 and 50 will also be in neutral position since brake 11 is retracted and the elevator 9 is in its neutral position, and in this condition of the movable potentiometer contacts the ratio $R_1/R_2$ is equal to $R_3/R_4$, and $R_5/R_6$ is equal to $R_7/R_8$ so that both relays, 44 and 55, are de-energized and their movable contacts 45 and 56 are open so that solenoid 23 is de-energized and valve 22 closes tube 20. The elevator motor 14 is also de-energized.

If the airplane now assumes a climbing attitude the gyro 30 will slide contacts 31 and 32 downwardly on their potentiometers. This will not affect either value $R_1$ or $R_2$ and hence the dive brake system will not be affected. However the resistance value $R_5$ will increase and $R_6$ will decrease so that $R_5/R_6$ will become greater than $R_7/R_8$, with the result that current will pass through the relay 55 in a direction to close contacts 56 and 58. Thereby motor 14 will be energized and will act through crank 16, link 17 and elevator horn 18 to rotate the elevator 9 in a clockwise direction as viewed in Figure 4; and the motor will also act through link 51 to simultaneously swing the contact 50 downwardly on potentiometer 49. Downward movement of the elevator trailing edge will apply a diving moment to the airplane which will act to return it to level flight attitude, and the downward movement of potentiometer contact 50 will increase $R_7$ and decrease $R_8$ until $R_5/R_6$ is again equal to $R_7/R_8$, whereupon the bridge will balance and relay 55 and motor 25 will be de-energized. As the airplane returns toward level flight attitude the sliding contacts 31 and 32 will be swung clockwise or upwardly toward their neutral positions by the gyroscope, and, while the brake bridge circuit is not affected this will act to reduce $R_5/R_6$ relative to $R_7/R_8$ unbalancing the bridge in a direction to cause reverse flow of current through relay 55, closing contacts 56 and 57, and thereby energizing motor 14 to return the elevator to neutral and contact 50 to their neutral positions. When these positions are reached the bridge circuit will again balance with resulting de-energization of the relay 55 and motor 14.

Should the airplane assume a diving attitude, an opposite sequence of operations will result, so that the trailing edge of elevator will first be raised to apply a positive pitching moment, and as the airplane responds to this moment and returns to level attitude the elevator will again be lowered to its neutral position.

As the airplane assumes the diving attitude the dive brake bridge circuit will become unbalanced by decrease of $R_1$ and increase of $R_2$, the resulting current flow through relay 44 closing movable contact 45 against fixed contact 46 and thereby energizing solenoid winding 24 to operate valve 22 to close air passage through the Venturi tube and direct ram air from passage 26 into tube 20. The ensuing inflation of bladder 12 will extend the dive brake 11, causing contact 39 to be swung upwardly and thereby decreasing $R_3$ relative to $R_4$. When $R_2/R_4$ becomes equal to $R_1/R_2$ the relay 44 will again be de-energized and the springs in valve housing 21 will return valve 22 to its neutral position closing tube 20 from both passages 26 and 27, and hence maintaining the bladder 12 and brake 11 at the proper extension for the particular angle of dive as reflected by the position of the gyroscope. Should the airplane now be returned to level flight or to a climbing attitude the bridge will again become unbalanced, but now in a direction to close contact 47 of the relay and thereby energize solenoid winding 25. This will cause the valve 22 to open the venturi for through passage of air and place suction passage 27 in communication with tube 20, so that the bladder 12 will be deflated and brake 11 retracted.

It will now be understood that the control means described provide for deflecting the elevator (and when, but only when, the airplane is diving for extending the dive brake), to a degree that is proportionate to the angle departure of the airplane from its normal attitude. By "normal" in this instance is meant departure of the airplane from the selected attitude in the case of the elevator and from level flight in the case of the dive brake.

It will be understood that by adjustment 36, to vary the position of sliding contact 32 relative to the plane of the gyroscope, the airplane may be gyroscopically controlled to automatically maintain any selected attitude which will then become the "normal" attitude insofar as the elevator control means are concerned. For example if element 36 is adjusted to decrease the effective length of link 35 between the gyroscope and sliding contact 32 the airplane will assume a climbing attitude which the automatic control means will thereafter seek to maintain. This result follows from the temporary unbalance of the elevator bridge circuit, by reason of $R_5$ decreasing relative to $R_6$, thus giving to the motor control relay 55 a signal that the airplane is in a diving attitude. Thereupon the motor will act to raise the elevator trailing edge causing the airplane to climb. When the climbing attitude selected by adjustment of 36 has been attained the contacts 32 and 50 will both be returned to their neutral positions relative to potentiometers 34 and 49 shown in Figure 4, and the gyroscope (which really remains horizontal) will be in counterclockwise tilted relation to the other parts shown in the view. To cause the airplane to assume a diving attitude the link 35 is effectively lengthened by adjustment 36, and in this case the reverse of the action described above will take place.

Figure 5:
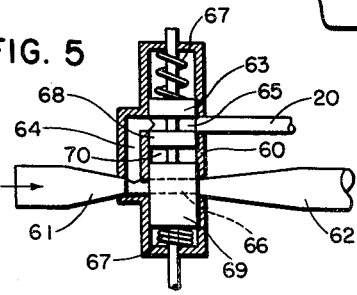

The Venturi tube and valve for selectively applying either ram pressure or suction to the tube 20 leading to the bladders 12 may be of various forms. One alternate arrangement is shown in Figure 5 where a valve casing 60 is arranged between the inlet and discharge sections 61 and 62 of the Venturi tube. The low pressure section or throat of the tube communicates with the tube 20 when a slide valve 63 is in its open position shown in the drawing, the path of such communication being through passage 64 and channel 65 in the valve. In this position a port 66 of the valve is aligned with the passage through the Venturi tube, so that airflow through the latter will induce air from tube 20, deflating the bladders.

When the valve is in its neutral position, to which it is urged by springs 67, the land 68 of the valve blocks the port to tube 20 so that there will be no airflow to or from the bladders. When the valve is in its opposite (full upward) position, land 69 blocks through-flow of air through the Venturi tube so that greater-than-atmospheric pressure will prevail at the throat, and the latter will communicate via passage 64 and valve channel 70 with tube 20. Accordingly in this valve position air will enter and inflate the bladders.

It will be understood that the inventive principles involved in apparatus described herein and illustrated in the accompanying drawings may be embodied in other physical formations and arrangements without departing from the spirit of the invention or from the scope of the appended claims.

We claim as our invention:

1. In an aircraft having a pair of laterally spaced vertical airfoils each having an opening in the outboard surface thereof, a brake flap hinged at the forward edge of each opening to close the latter when in retracted position and to project laterally from the airfoil when in extended position, an inflatable bladder secured to each airfoil and the related flap, each bladder when inflated supporting the flap in extended position and when deflated being disposed within the confines of the related airfoil and holding the flap retracted, a Venturi tube extending longitudinally through one airfoil for receiving and passing air from the adjacent airstream, valve means for selectively placing the bladders in fluid communication with either a high or a low pressure section of the tube or closing the bladders from communication with the tube, said valve means being arranged to block discharge of air from the discharge end of the tube when the bladders are placed in communication with said high pressure section, and gyroscopically controlled means for operating said valve means to inflate the bladders by placing them in communication with said high pressure section when the aircraft is in a diving attitude, said gyroscopically controlled means in other attitudes of the aircraft operating the valve to deflate the bladders by placing them in communication with said low pressure section.

2. In an aircraft having a pair of laterally spaced vertical airfoils each having an opening in the outboard surface thereof, a brake flap hinged at the forward edge of each opening to close the latter when in retracted position and to project laterally from the airfoil when in extended position, an inflatable bladder secured to each airfoil and the related flap, each bladder when inflated supporting the flap in extended position and when deflated being disposed within the confines of the related airfoil and holding the flap retracted, a Venturi tube extending longitudinally through one airfoil for receiving and passing air from the adjacent airstream, valve means for selectively placing the bladders in fluid communication with either a high pressure section of the tube for inflating the bladders or a low pressure section of the tube for deflating the bladders or closing the bladders from communication with the tube, said valve means being arranged to block discharge of air from the discharge end of the tube when the bladders are placed in communication with said high pressure section, and means responsive to the flight attitude of the aircraft for operating said valve means to maintain inflation of the bladders when the aircraft is in a diving attitude and to maintain the bladders deflated when the aircraft is in level flight and climbing attitudes.

3. In an aircraft having an airfoil having an opening in a surface thereof, a brake flap hinged at the forward edge of the opening to close the latter when in retracted position and to project laterally from the airfoil when in extended position, an inflatable bladder secured to the airfoil and to the flap, the bladder when inflated supporting the flap in extended position and when deflated being disposed within the confines of the airfoil and holding the flap retracted, a Venturi tube arranged to receive and pass air from the airstream adjacent the aircraft, valve means for selectively placing the bladder in fluid communication with either a high or a low pressure section of the tube or closing the bladder from communication with the tube, said valve means being arranged to block discharge of air from the discharge end of the tube when the bladder is placed in communication with said high pressure section, and means responsive to attitude of the aircraft for operating said valve means to inflate the bladder by placing it in communication with said high pressure section when the aircraft is in a diving attitude, said valve operating means in other attitudes of the aircraft conditioning the valve to deflate the bladder by placing it in communication with said low pressure section.

4. In an aircraft having a brake surface mounted to retract into the aircraft body or to extend to a position in which it projects therefrom for air braking action, a pneumatic device for operating the brake surface between the retracted and extended positions thereof, a Venturi tube arranged to receive and pass air from the airstream adjacent the aircraft, and valve means for selectively placing said pneumatic device in fluid communication with either a high or a low pressure section of the tube or closing the device from communication with the tube, said valve means being arranged to block discharge of air from the discharge end of the tube when the device is placed in communication with said high pressure section, said pneumatic device when in communication with said high pressure section operating the brake surface toward one of said positions thereof and when in communication with said low pressure section operating the brake surface toward the other of said positions thereof.

5. In an aircraft having a brake surface mounted to retract into the aircraft body or to extend to a position in which it projects therefrom for air braking action, a pneumatic device for operating the brake surface between the retracted and extended positions thereof, a Venturi tube arranged to receive and pass air from the airstream adjacent the aircraft, and valve means for selectively placing said pneumatic device in fluid communication with either a high or a low pressure section of the tube or closing the device from communication with the tube, said pneumatic device when in communication with said high pressure section operating the brake surface toward one of said positions thereof and when in communication with said low pressure section operating the brake surface toward the other of said positions thereof.

6. In an aircraft having a brake surface mounted to retract into the aircraft body or to extend to a position in which it projects therefrom for air braking action, a pneumatic device for operating the brake surface between the retracted and extended positions thereof, tubular means arranged to receive and pass ram air from the airstream adjacent the aircraft, said tubular means having a restricted portion whereat a low pressure prevails whereby said tubular means constitutes a source of high pressure and a source of low pressure, and three-position valve means for selectively placing said pneumatic device in fluid communication with either said high pressure source or said low pressure source or closing the device from communication with both of said sources, said pneumatic device when in communication with said high pressure source operating the brake surface toward one of said positions thereof and when in communication with said low pressure source operating the brake surface toward the other of said positions thereof.

7. In an aircraft having a brake surface mounted to retract into the aircraft body or to extend to a position in which it projects therefrom for air braking action, a pneumatic device for operating the brake surface between the retracted and extended positions thereof, tubular means arranged to receive and pass ram air from the airstream adjacent the aircraft, said tubular means having a restricted portion whereat a low pressure prevails whereby said tubular means constitute a source of high pressure and a source of low pressure, electrically operated valve means for selectively placing said pneumatic device in fluid communication with said high pressure source to extend the brake surface or with said low pressure source to retract the brake surface or closed from communication with both of said sources to support the brake surface against movement relative to the aircraft body, a three position polarized relay for controlling said valve means, gyroscopically controlled operating means responsive to the attitude of the aircraft about its pitching axis, a Wheatstone bridge circuit having said relay connected across the output terminals thereof and a direct current source across the input terminals thereof, the arms of the bridge circuit comprising two potentiometers whose sliding contacts constitute one pair of terminals of the bridge, the sliding contact of one potentiometer being connected to said brake surface for operation thereby in response to movements thereof by said pneumatic means, the sliding contact of the other potentiometer being connected to said gyroscopically controlled operating means for movement thereby in response to changes in attitude of the aircraft, and said other potentiometer being so constructed and arranged that the condition of balance of the bridge is unaffected by movements of said gyroscopically controlled operating means in response to change of positive angle of attack of the aircraft.

8. In an aircraft control system, a dive brake and reversible actuating means therefor including a polarized relay, operating means responsive to the attitude of the aircraft about its pitching axis, a Wheastone bridge circuit having said relay connected across the output terminals thereof and a direct current source across the input terminals thereof, the arms of the bridge circuit comprising two potentiometers whose sliding contacts constitute one pair of terminals of the bridge, the sliding contact of one potentiometer being connected to said dive brake for operation by the latter in response to extensive and retractive movements thereof, the sliding contacts of the other potentiometer being connected to said operating means for movement thereby in response to changes in attitude of the aircraft, and said other potentiometer being so constructed and arranged that its resistance values remain substantially constant during movements of said operating means in response to change of positive angle of attack of the aircraft, whereby the condition of balance of the bridge is unaffected by such change of positive angle of attack.

9. In an aircraft control system, a dive brake and reversible actuating means therefor including a polarized relay, operating means responsive to the attitude of the aircraft about its pitching axis, a Wheatstone bridge circuit having said relay connected across the output terminals thereof and a direct current source across the input terminals thereof, the arms of the bridge circuit comprising two potentiometers whose sliding contacts constitute one pair of terminals of the bridge, the sliding contacts of one potentiometer being connected to said dive brake for operation by the latter in response to extensive and retractive movements thereof, and the sliding contact of the other potentiometer being connected to said operating means for movement thereby in response to changes in attitude of the aircraft.

10. In an aircraft control system, an elevator and reversible actuating means therefor including a first polarized relay, a dive brake and reversible actuating means therefor including a second polarized relay, operating means responsive to the attitude of the aircraft about its pitching axis, a first Wheatstone bridge circuit having said first relay connected across the output terminals thereof and a direct current source across the input terminals thereof, a second Wheatstone bridge circuit having said second relay connected across the output terminals thereof and a direct current source across the input terminals thereof, the arms of each bridge circuit comprising two potentiometers whose sliding contacts constitute one pair of terminals of the bridge, the sliding contact of one potentiometer of the first bridge circuit being connected to said elevator for operation thereby in response to elevator movement and the sliding contact of one potentiometer of the second bridge circuit being connected to said dive brake for operation thereby in response to dive brake movement, the sliding contacts of the other two potentiometers being connected to said operating means for movement thereby in response to changes in attitude of the aircraft, said other potentiometer of said first bridge circuit being so constructed and arranged that the condition of balance of the bridge is unaffected by movements of said operating means in response to change of positive angle of attack of the aircraft, and means for adjusting the connection between said operating means and the connected potentiometer contact of the second bridge to adjust the attitude of the aircraft that is to be maintained by the system.

11. In an aircraft control system, a movable control surface and reversible actuating means therefor including a polarized relay, operating means responsive to the attitude of the aircraft, a Wheatstone bridge circuit having said relay connected across the output terminals thereof and a direct current source across the input terminals thereof, the arms of the bridge circuit comprising two potentiometers whose sliding contacts constitute one pair of terminals of the bridge, the sliding contact of one potentiometer being connected to said surface for operation thereby in response to aircraft control movements thereof, the sliding contact of the other potentiometer having a connection to said operating means for movement thereby in response to changes in attitude of the aircraft, and means for adjusting said connection to adjust the attitude of the aircraft that is to be maintained by the system.

12. In an aircraft control system, an elevator and reversible actuating means therefor including a first polarized relay, a dive brake and reversible actuating means therefor including a second polarized relay, operating means responsive to the attitude of the aircraft about its pitching axis, a first Wheatstone bridge circuit having said first relay connected across the output terminals thereof and a direct current source across the input terminals thereof, a second Wheatstone bridge circuit having said second relay connected across the output terminals thereof and a direct current source across the input terminals thereof, the arms of each bridge circuit comprising two potentiometers whose sliding contacts constitute one pair of terminals of the bridge, the sliding contact of one potentiometer of the first bridge circuit being connected to said elevator for operation thereby in response to elevator movement and the sliding contact of one potentiometer of the second bridge circuit being connected to said dive brake for operation thereby in response to dive brake movement, the sliding contacts of the other two potentiometers being connected to said operating means for movement thereby in response to changes in attitude of the aircraft, and said other potentiometer of said first bridge circuit being so constructed and arranged that its resistance values remain substantially constant during movements of said operating means in response to change of positive angle of attack of the aircraft, whereby the condition of balance of the bridge is unaffected by such change of positive angle of attack.

13. In an aircraft control system, an elevator and reversible actuating means therefor including a first polarized relay, a dive brake and reversible actuating means therefor including a second polarized relay, operating means responsive to the attitude of the aircraft about its pitching axis, a first Wheatstone bridge circuit having said first relay connected across the output terminals thereof and a direct current source across the input terminals thereof, a second Wheatstone bridge circuit having said second relay connected across the output terminals thereof and a direct current source across the input terminals thereof, the arms of each bridge circuit comprising two potentiometers whose sliding contacts constitute one pair of terminals of the bridge, the sliding contact of one potentiometer of the first bridge circuit being connected to said elevator for operation thereby in response to elevator movement and the sliding contact of one potentiometer of the second bridge circuit being connected to said dive brake for operation thereby in response to dive brake movement, and the sliding contacts of the other two potentiometers being connected to said operating means for movement thereby in response to changes in attitude of the aircraft.

14. In an aircraft control system, an elevator and reversible actuating means therefor including a first polarized relay, a dive brake and reversible actuating means therefor including a second polarized relay, operating means responsive to the attitude of the aircraft about its pitching axis, a first Wheatstone bridge circuit having said first relay connected across the output terminals thereof and a direct current source across the input terminals thereof, a second Wheatstone bridge circuit having said second relay connected across the output terminals thereof and a direct current source across the input terminals thereof, the arms of each bridge circuit comprising two potentiometers whose sliding contacts constitute one pair of terminals of the bridge, the sliding contact of one potentiometer of the first bridge circuit being connected to said elevator for operation thereby in response to elevator movement and the sliding contact of one potentiometer of the second bridge circuit being connected to said dive brake for operation thereby in response to dive brake movement, sliding contacts of the other two potentiometers being connected to said operating means for movement thereby in response to changes in attitude of the aircraft, and means for adjusting the connection between said operating means and the connected potentiometer contact of the second bridge to adjust the attitude of the aircraft that is to be maintained by the system.

15. In an aircraft control system, an elevator and a reversible actuating means therefor, a dive brake and reversible actuating means therefor, a common control means for the elevator actuating means and the dive brake actuating means, said common control means being responsive to the attitude of the aircraft about its pitching axis, said common control means and said dive brake actuating means cooperating to move the dive brake to positions of greater and lesser braking effectiveness respectively upon increase and decrease of the negative angle of attack of the aircraft, said common control means and said elevator actuating means cooperating to maintain the aircraft in a selected attitude about said pitching axis, and means for adjusting the relationship between said common control means and said dive brake actuating means to thereby select the attitude that is to be so maintained.

BRUCE G. EATON.
WILLIAM J. CLARK.

REFERENCES CITED

The following references are of record in the file of this patent:

UNITED STATES PATENTS

| Number | Name | Date |
|---|---|---|
| 1,028,336 | Duchting | June 4, 1912 |
| 1,412,807 | Kraft | Apr. 11, 1922 |
| 2,158,598 | Watter | May 16, 1939 |
| 2,387,795 | Isserstedt | Oct. 30, 1945 |
| 2,392,443 | Youngman | Jan. 8, 1946 |
| 2,398,421 | Frische et al. | Apr. 16, 1946 |
| 2,421,870 | Dornier et al. | June 10, 1947 |
| 2,460,843 | Ours | Feb. 8, 1949 |

FOREIGN PATENTS

| Number | Country | Date |
|---|---|---|
| 563,319 | Great Britain | Aug. 9, 1944 |
| 563,433 | Great Britain | Aug. 15, 1944 |